United States Patent [19]
Rasmussen

[11] Patent Number: 6,037,742
[45] Date of Patent: Mar. 14, 2000

[54] METHOD FOR THE FIELD-ORIENTED CONTROL OF AN INDUCTION MOTOR

[75] Inventor: Henrik Rasmussen, Skørping, Denmark

[73] Assignee: Danfoss A/S, Nordborg, Denmark

[21] Appl. No.: 09/077,339

[22] PCT Filed: Dec. 5, 1996

[86] PCT No.: PCT/DK96/00512

§ 371 Date: Nov. 27, 1998

§ 102(e) Date: Nov. 27, 1998

[87] PCT Pub. No.: WO97/21269

PCT Pub. Date: Jun. 12, 1997

[30] Foreign Application Priority Data

Dec. 7, 1995 [DE] Germany ............... 195 45 709

[51] Int. Cl.[7] .................................................. H02P 21/00
[52] U.S. Cl. .................. 318/807; 318/799; 318/805; 318/809; 318/810
[58] Field of Search .................. 364/149–163; 318/799–811

[56] References Cited

U.S. PATENT DOCUMENTS

| 4,361,794 | 11/1982 | Kawada et al. | 318/800 |
|---|---|---|---|
| 4,388,577 | 6/1983 | Blaschke et al. | 318/717 |
| 4,467,259 | 8/1984 | Duff | 318/800 |
| 4,707,651 | 11/1987 | Schauder | 318/800 |
| 4,777,422 | 10/1988 | Slicker et al. | 318/800 |
| 5,144,216 | 9/1992 | De Doncker | 318/807 |
| 5,204,607 | 4/1993 | Hugel et al. | 318/806 |
| 5,296,794 | 3/1994 | Lang et al. | 318/715 |
| 5,565,752 | 10/1996 | Jansen et al. | 318/807 |
| 5,585,709 | 12/1996 | Jansen et al. | 318/807 |
| 5,598,081 | 1/1997 | Okamura et al. | 318/801 |
| 5,637,974 | 6/1997 | McCann | 318/701 |

Primary Examiner—Robert E. Nappi
Assistant Examiner—Rita Leykin
Attorney, Agent, or Firm—Lee, Mann, Smith, McWilliams, Sweeney & Ohlson

[57] ABSTRACT

A method for the field-oriented control of an induction motor (2) by means of a frequency converter (1) is disclosed, in which method a transformation angle ($\delta$) is determined by estimation and is corrected in dependence on a rotational speed ($\omega_{mR}$) of a rotor flux vector ($i_{mR}$) or of the induction motor (2) and/or in dependence on a delay time ($T_{del}$). In this connection it is desirable to improve the control behavior. To that end, the transformation angle ($\delta$) is corrected a second time to compensate for a phase shift in the frequency converter (1).

19 Claims, 5 Drawing Sheets a)

b)

a)

b)

METHOD FOR THE FIELD-ORIENTED CONTROL OF AN INDUCTION MOTOR

BACKGROUND OF THE INVENTION

The invention relates to a method for the field-oriented control of an induction motor by means of a frequency converter, in which method a transformation angle is determined by estimation and is corrected in dependence on a rotational speed of a rotor flux vector or of the induction motor and/or in dependence on a delay time.

For the field-oriented control of induction motors, it is normally necessary to have information about the magnitude and position of the rotor flux vector that is as accurate as possible. In an ordinary squirrel-cage motor, however, it is not normally possible to measure the rotor current. For that reason the rotor flux is estimated using an observer. The estimation comprises in this case a calculation using measured values and/or assumed values.

Different types of observers are known: W. Leonhard "Control of Electrical Drives" (Heidelberg, 1990, p. 214 ff.), and D. S. Wijesundera and R. D. Jackson "Observers for field-oriented control of induction motor drives" (IEE Proceedings-B, Vol. 139, 1992, p. 381 ff.) describe the construction of rotor flux vector observers, but these are relatively bulky and complicated.

An "observer" is normally a form of estimating device, which is also known as an estimator and which uses both the output data of a model and a feed-back loop to correct errors and improve the accuracy of the estimation. Such estimators are called "closed-loop observers", that is, estimators having a closed-loop control circuit. In addition to those there are "open-loop observers" without a feed-back loop, which generally carry out a real time simulation of the control, which results in very short response times. Moreover, because there is no feed-back loop the stability is often better. Opportunity for correction, however, is limited.

With such types of observer, both the current equation and the voltage equation can be used for field-oriented motor control. Lower-order models are adequate for that purpose. If it is desirable to evaluate both the current equation and the voltage equation of the induction motor, higher-order observers are required, which are accordingly complex and generally also require higher calculating capacity.

In observers which are based on the voltage equation, the stator voltage is measured. If one does not wish or is not able to measure the stator voltage, simpler direct feedback observers which are based on the current equation are used instead. The efficiency of these observers is relatively poor, however, because the estimation of the transformation angle is not accurate.

On the other hand, these simple observers with the correspondingly simpler estimating devices have the advantage of a simpler construction and shorter calculation times.

SUMMARY OF THE INVENTION

The invention is based on the problem of achieving an improvement in the control behaviour of such estimating devices.

In a method of the kind mentioned in the introduction, that problem is solved in that the transformation angle is corrected a second time to compensate for a phase shift in the frequency converter.

It has, in fact, been discovered that the inaccuracy of the transformation angle is based substantially on a phase shift in the frequency converter. This phase shift is caused by, inter alia, non-linearities in the frequency converter. These non-linearities and possibly also yet other influencing variables in the frequency converter change the amplitude only very slowly, so that this change in amplitude has virtually no effects. It is perhaps for that reason that the effect of the phase shift on the inaccuracy in the transformation angle has so far been largely overlooked. By the simple expedient of correcting the transformation angle to compensate for this phase shift in the frequency converter, a significantly improved control behaviour of the induction motor is achieved.

The transformation angle is preferably changed in the case of the second correction by addition of an error angle. The error angle can be positive or negative. Since the entire observer is normally realized as software or hardware, the formation of a summation point for carrying out the addition is a relatively simple measure for implementing the correction.

It is also preferred for the transformation angle and the error angle to be determined in a two-phase system and for the transformation angle to be corrected by the error angle directly prior to the inverse transformation into a three-phase or multi-phase system. The transformation into a two-phase system is known per se. With two phases shifted through 90° with respect to one another, which can also be represented extremely easily in a biaxial system of co-ordinates, a rotating field model can be produced, as is necessary for an induction motor. In such a two-phase or biaxial system most calculations can be made more simply. In fact, however, most induction motors are operated with rotating fields which are based on a three-phase or multi-phase system. The transformation from the three-phase or multi-phase system into a system of fewer phases is therefore necessary in order to facilitate the calculation, and an inverse transformation into the three-phase or multi-phase system is necessary in order to effect the control in just that system. If the error correction is carried out immediately before the inverse transformation, the possibilities that further errors will occur as a result of further processing of the transformation angle are fewer.

It is also preferred for the first and the second correction to be performed simultaneously. In that case, for example, two additions can be carried out virtually simultaneously or the correction can be left running in the same summation point.

The correction is preferably effected in a rotor flux-oriented system. This simplifies simulation in the observer.

It is also preferred for the rotor magnetizing current to be used as reference vector in the two-phase system. A defined output variable is thus provided which is present in the observer in any case.

Preferably, the error angle is calculated. The calculation can be effected relatively quickly so that short response times are obtained. Feedback is not needed. In this manner the stability characteristics of the control are improved.

In an especially preferred construction, provision is made for the two current components of the two-phase system oriented orthogonally with respect to one another, the angular velocity of the reference vector and a voltage reference vector, to be used to calculate the error angle. With these few components the error angle can be calculated relatively easily. The effort involved in calculation thus remains low.

In that connection it is especially preferred for the voltage reference vector to be a component of a reference voltage oriented in the direction of a main axis of a biaxial system of co-ordinates. The calculation of the error angle can therefore be limited to components of single axis. That results in a largely one-dimensional behaviour, that is, a calculation merely using one scalar with correspondingly short and simple calculations.

The error angle is preferably calculated iteratively by minimizing a difference between a voltage reference vector component and a component of an estimated voltage. Although several calculation processes in succession are needed for the iterative solution, these calculation processes can be restricted to simple operations. In most cases, with an iterative solution an error angle of a greater accuracy is obtained than with a direct solution, because rounding errors in the iteration balance out.

The error angle is preferably limited to a range of ±0.4 radians. By stipulating the limit the effort involved in calculation can be kept small.

Nevertheless, the control behaviour of the motor can be noticeably improved with such an error angle.

BRIEF DESCRIPTION OF THE DRAWING

The invention is described hereinafter with reference to a preferred embodiment. In the drawings.

DESCRIPTION OF THE PREFERRED EMBODIMENT

Figure 1:
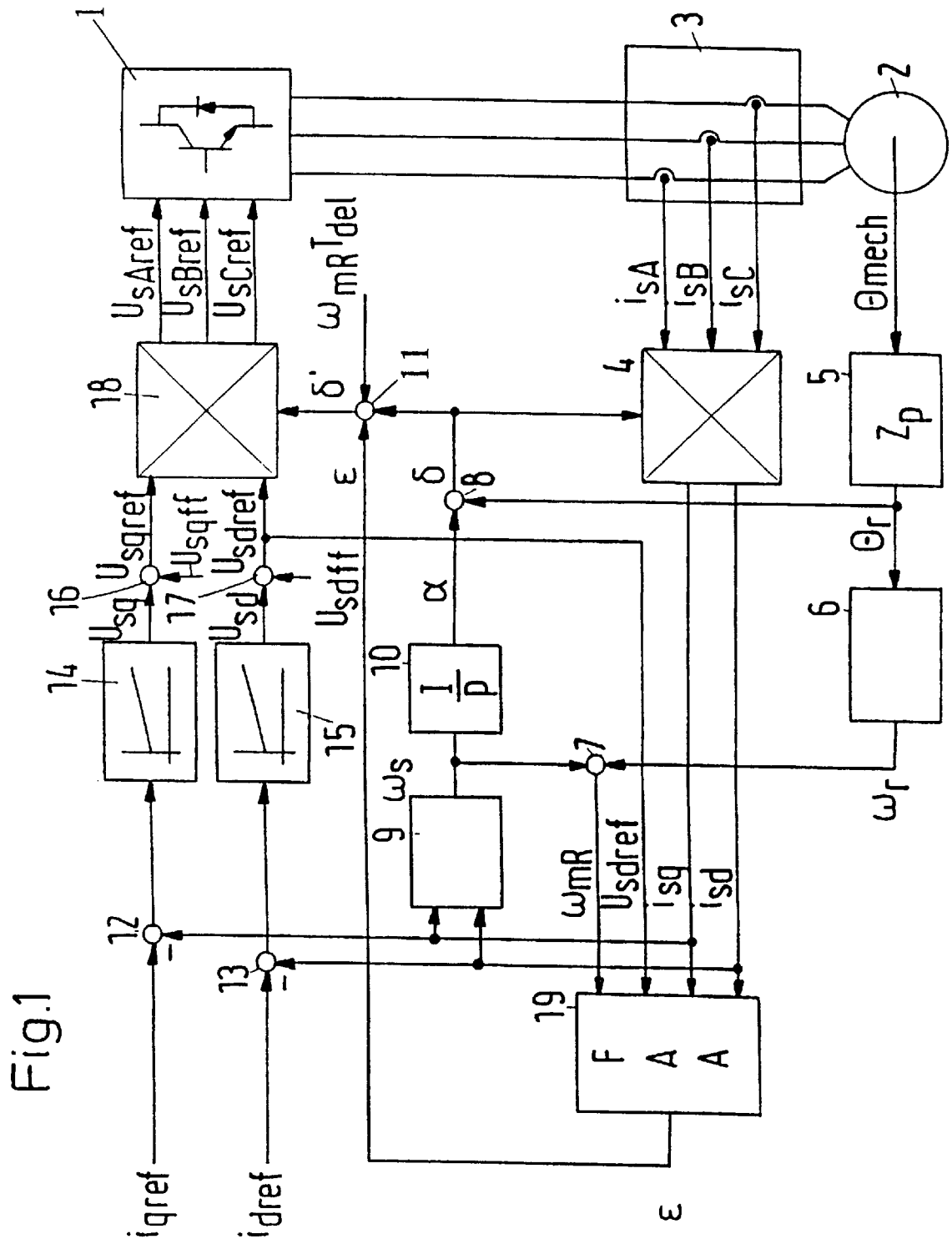
FIG. 1 is a diagrammatic view of a control system of an induction motor.

FIG. 1 shows diagrammatically a block circuit diagram, with reference to which the control method according to the invention is to be explained.

A customary three-phase frequency converter 1 drives an induction motor 2. The induction motor 2 is, for example, in the form of an asynchronous motor with a squirrel cage rotor. The frequency converter 1, when it is supplied with direct current, can also be in the form of a simple inverter.

Between the frequency converter 1 and the motor 2 there is connected in the leads a current-measuring device 3, by means of which the phase currents are measured. Corresponding signals $i_{sA}$, $i_{sB}$, $i_{sC}$ are supplied to a converter 4 which transforms or converts the currents from the three-phase system into a two-phase system. As far as current is concerned, this two-phase system can then be represented by currents $i_{sq}$, $i_{sd}$. These two currents are oriented orthogonally with respect to one another. They appear at the output of the converter 4. These currents can also be described in a biaxial d-q system of co-ordinates, as is generally well known.

The currents $i_{sq}$ and $i_{sd}$ are supplied to a compensating unit 19 which carries out an field angle adaptation, which will be described later.

The current $i_{sq}$ is furthermore supplied to a summation point 12 and the current $i_{sd}$ is supplied to a summation point 13, where a difference formation with reference currents $i_{qref}$ and $i_{dref}$ takes place. The behaviour of the induction motor 2 is controlled or preset using the currents $i_{qref}$ and $i_{dref}$, The differences between the currents $i_{qref}$ and $i_{sq}$ and between $i_{dref}$ and $i_{sd}$ are supplied to controllers 14, 15 which in the present embodiment are in the form of PI controllers. These have as output the amplitude of the stator voltage vectors $u_{sq}$, $u_{sd}$.

The outputs of the controllers 14, 15 are supplied to summation points 16, 17 respectively, where voltage values $u_{sqff}$ and $u_{sdff}$ respectively are added to them. These voltage values $u_{sqff}$ and $u_{sdff}$ are positive feedback contributions which serve to compensate for non-linearities. At the output of the summation points 16, 17 the voltage values $u_{sqref}$ and $u_{sdref}$ respectively then appear, which are supplied to a converter 18; taking account of a transformation angle δ', this generates control voltages $u_{sAref}$, $u_{aBref}$, $u_{sCref}$ for the frequency converter 1.

A position measurer on the axis of the induction motor 2 delivers an angular position signal $θ_{mech}$ which is converted in a converter 5 into an electrical angle $θ_r$. The converter 5 in this case takes into account the number of pole pairs in the motor 2. In the simplest case it multiplies the mechanical angle $θ_{mech}$ by the number of pole pairs.

The signal of the electrical angle $θ_r$ is supplied both to a summation point 8 and to a speed estimator 6. The speed estimator 6 determines the angular velocity $ω_r$ of the rotor from the electrical angle $θ_r$, or more accurately, from its change over time.

The angular velocity $ω_r$ is supplied to a summation point 7. A contribution $ω_s$, which is an expression of the slip of the rotor with respect to the rotating field, is also supplied to this summation point 7. The slip $ω_s$ is determined by means of a flux estimator 9 to which the two current components $i_{sq}$, $i_{sd}$ are supplied. An angular velocity $ω_{mR}$ of a magnetizing current vector $i_{mR}$ is then obtained at the output of the summation point 7. The angular velocity $ω_{mR}$ of the magnetizing current vector $i_{mR}$ is also supplied to the compensating unit 19.

The estimators 6, 9 can also be called estimating devices or calculating devices. They determine an output variable from predetermined input variables.

The slip $ω_s$ is also supplied to an integrator 10, which adds the slip onto or integrates the slip to an angle α, which is added in the summation point 8 to the instantaneous electrical angular position $θ_r$ of the rotor. The result is a transformation angle δ.

This transformation angle δ is on the one hand supplied to the converter 4, which thus performs the conversion from the three-phase system $i_{sA}$, $i_{sB}$, $i_{sC}$ into the two-phase system $i_{sq}$, $i_{sd}$. On the other hand the transformation angle δ is supplied to a summation point 11, where a product from the angular velocity $ω_{mR}$ and a time $T_{del}$ is added. This product compensates in known manner for delays in the control system itself.

All the functional elements described can also be realized in a computer program by method steps. Alternatively, of course, a hardware solution is possible.

As a special feature, not only is a variable $ω_{mR}T_{del}$, which compensates for the time delays in the control system itself, added on in the summation point 11, an error angle ε which is calculated by the compensating unit 19 is also added. For that purpose the compensating unit 19 carries out a field angle adaptation (FAA). In this manner the transformation angle δ is corrected by the error angle ε. An optimum transformation angle δ' is thus obtained, which is supplied to the converter 18 which is therefore able to generate an improved set of control voltages $u_{sAref}$, $u_{sBref}$, $u_{sCref}$.

As one can see from FIG. 1, only four variables from which the error angle ε can be calculated are supplied to the compensating unit 19. These variables are the current components $i_{sq}$, $i_{sd}$, a voltage component $u_{sdref}$ and the angular velocity $\omega_{mR}$.

Figure 2:
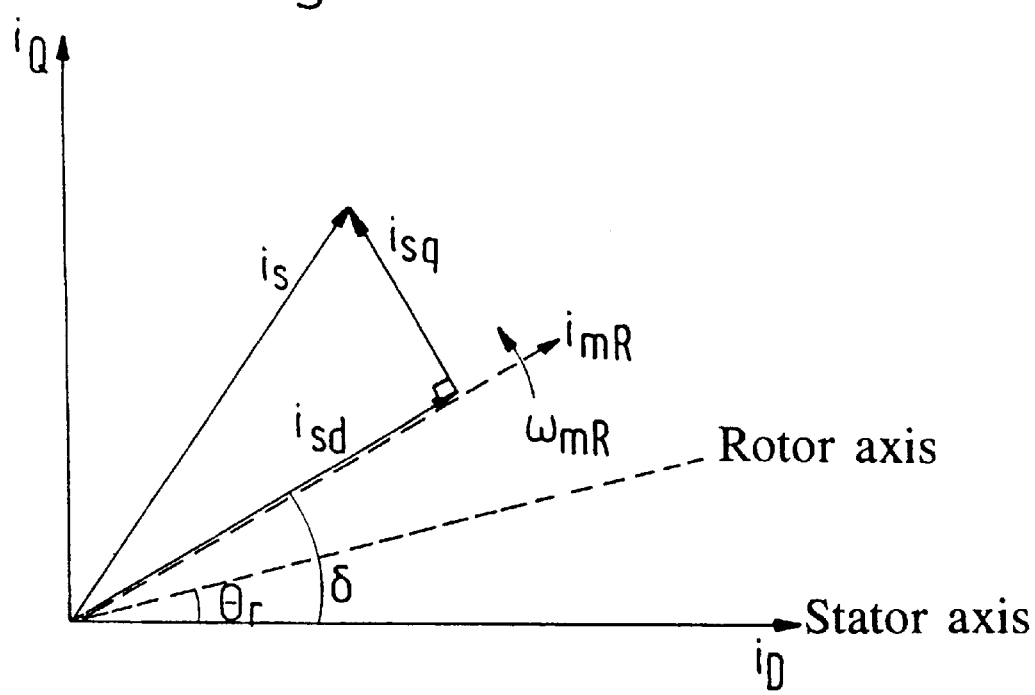
FIG. 2 is a system of co-ordinates for defining different angles.

The variables are most advantageously explained with reference to FIG. 2. FIG. 2 shows a biaxial system of co-ordinates in which the currents of a two-phase system are plotted. The horizontal axis is in this case the stator axis. The rotor axis is drawn in with a broken line and forms the angle $\theta_r$ with the stator axis. The magnetizing current vector $i_{mR}$ which runs with the angular velocity $\omega_{mR}$ in the direction indicated by the arrow is also drawn in with a broken line. This vector forms the reference point for all vectors in the biaxial field-oriented system of co-ordinates. The vector $i_{mR}$ is in phase with the vector $i_{sd}$, that is, the d-component of the stator current $i_s$. The vector $i_{sd}$ forms the transformation angle $\delta$ with the stator axis. This angle is often also called the flux angle.

Figure 3:
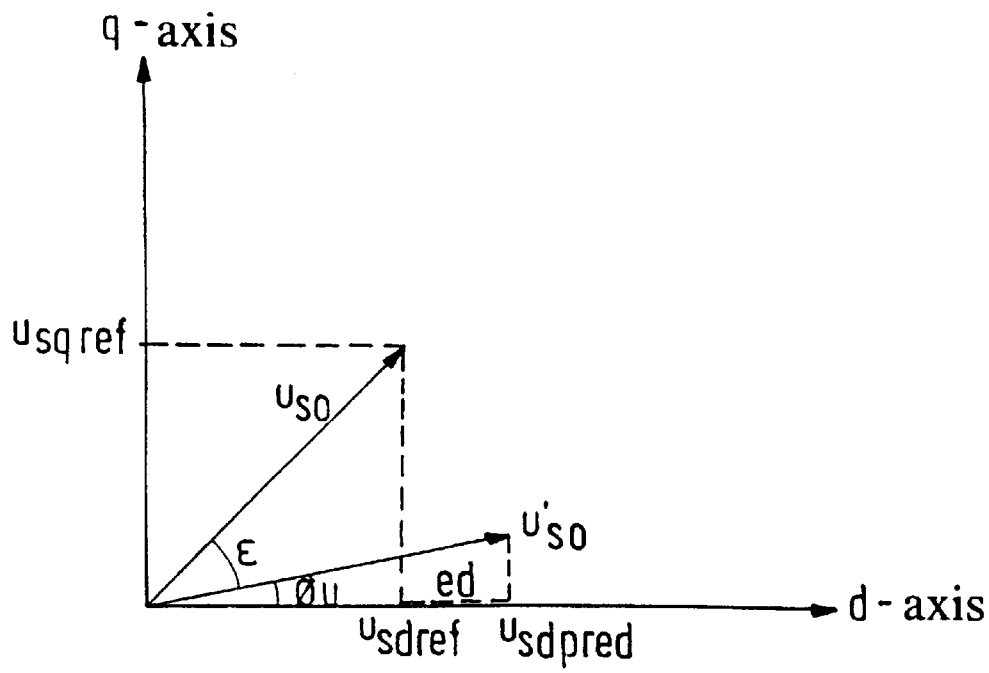
FIG. 3 is a system of co-ordinates with voltage vectors for explaining how the error angle is determined, FIGS. 4a&b shows a response to a phase error in a control system with and without error correction, FIGS. 5a&b shows a response to reversing of the motor with and without error correction, FIGS. 6a&b shows a response to an increased rotor resistance with and without error correction.

Referring to FIG. 3, an explanation of how the error angle is determined follows.

The vector $u_{sO}$ is the summation vector of the two reference voltages $u_{sqref}$ and $u_{sdref}$ in the biaxial rotor flux oriented system of co-ordinates. As described above, $u_{sqref}$ and $u_{sdref}$ are output signals of the summation points 16, 17 in FIG. 1.

Whereas the contribution $\omega_{mR}T_{del}$ corrects delays in the control system itself, $\epsilon$ is used to correct non-linearities in the frequency converter 1. These non-linearities are dependent on the current intensity. They cause a merely negligible amplitude error but a substantial phase error. This error corresponds to the angle $\epsilon$, which is indicated in FIG. 3. The error angle $\epsilon$ corresponds to the phase difference between the voltage vector $u_{sO}$ and an estimated or calculated voltage vector $u'_{sO}$. In this connection, to simplify matters it is assumed that the amplitudes of $u_{sO}$ and $u'_{sO}$ are the same, which is a good approximation to reality. The estimated voltage vector $u'_{sO}$ has a d-axis component $u_{sdpred}$. The voltage vector $u_{sO}$ has the d-axis component $u_{sdref}$. It is possible to obtain an expression for the error angle $\epsilon$ from consideration of the difference between $u_{sdref}$ and $u_{sdpred}$. Using this error angle, the phase error can be eliminated again in the transformation process (converter 18) to the physical system from the rotor flux oriented system of co-ordinates. The error angle $\epsilon$ can in this respect be removed by adding this angle with inverse sign to the original transformation angle $\delta$, in order to obtain the corrected transformation angle $\delta'$.

The error angle $\epsilon$ is found in the compensating unit 19 by taking into account exclusively the components in the d-axis. In this manner one can restrict oneself to a single main direction in the system of co-ordinates, which simplifies the calculation quite considerably because it remains one-dimensional.

The value of $u_{sdpred}$ is calculated in the compensating unit 19 on the basis of the relationship:

$$u_{sdpred} = R_s i_{sd} - \omega_{mR} L'_s i_{sq} \qquad (1)$$

in which $i_{sd}$, $i_{sq}$ and $\omega_{mR}$ are the input parameters for the compensating device 19. In this connection it is assumed that the motor parameters $R_s$ (stator resistance) and $L'_s$ (stator self-induction) are known. This can be realized, for example, in that the frequency converter 1 measures the motor parameters before the start.

The error angle $\epsilon$ is now contained in the difference between user and $u_{sdref}$ and $u_{sdpred}$, which can be derived with reference to FIG. 3:

$$e_d u_{sdref} - u_{sdpred} = u_{sO} \cos(\phi_u + \epsilon) - U'_{sO} \cos(\phi_u) \qquad (2)$$

in which $\phi_u$ is the angle between the estimated voltage vector $U'_{sO}$ of the d-axis component $u_{sdpred}$.

In equation (2), all parameters apart from $\epsilon$ are known. The angle $\epsilon$ can be eliminated only with difficulty from the expression $\phi_u + \epsilon$.

$\phi_u + \epsilon$ is therefore made $= \gamma$ and an expression $$e_d = U_{sO} \cos(\gamma - \epsilon^*) - U'_{sO} \cos(\phi_u) \qquad (3)$$

is formed. According to this the error angle $\epsilon$ is varied until the expression $e_d$ equals or is almost zero. In that case $\epsilon^* = \epsilon$, whereby the desired error angle may be determined.

The error angle $\epsilon$ found in this manner is added in the summation point 11 (FIG. 1) to the uncorrected transformation angle $\delta$, optionally together with the compensating contribution $\omega_{mR}T_{del}$. The error angle $\epsilon$ is in this embodiment restricted to being able to assume values in the range ±0.4 radians.

There are, of course, also other possible ways of determining the error angle $\epsilon$, for example by using the negative gradient method (MIT algorithm), direct solving of the equation system or other iterative methods.

Figure 4:
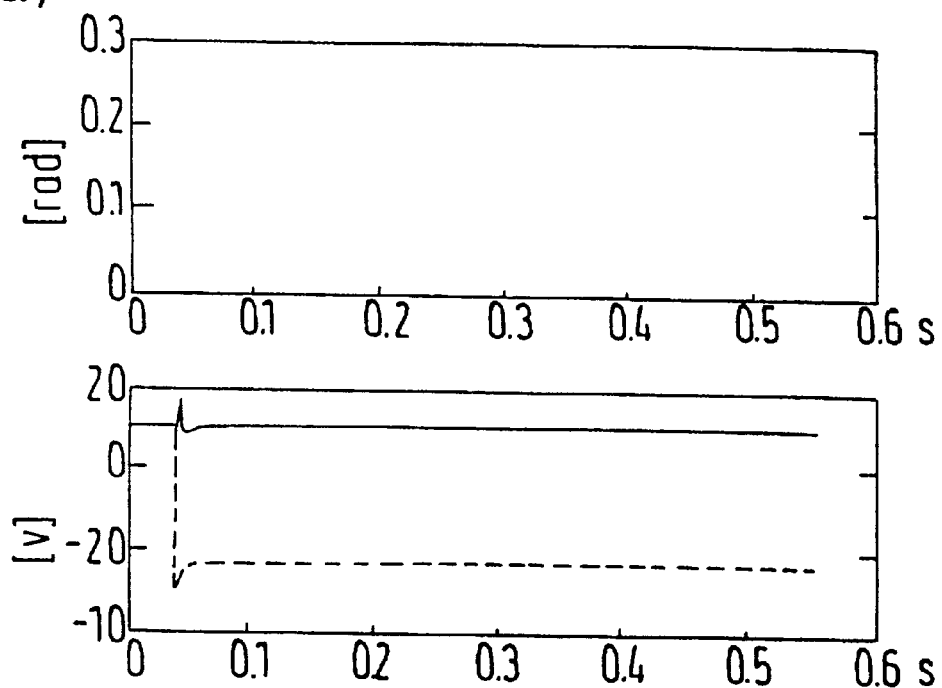
Figure 4:
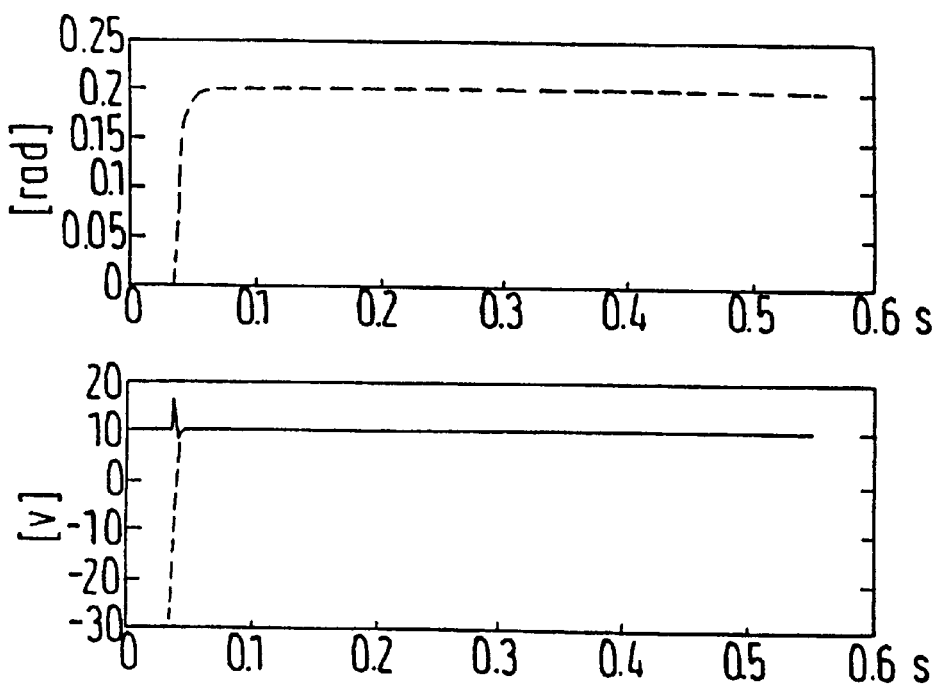
Figure 5:
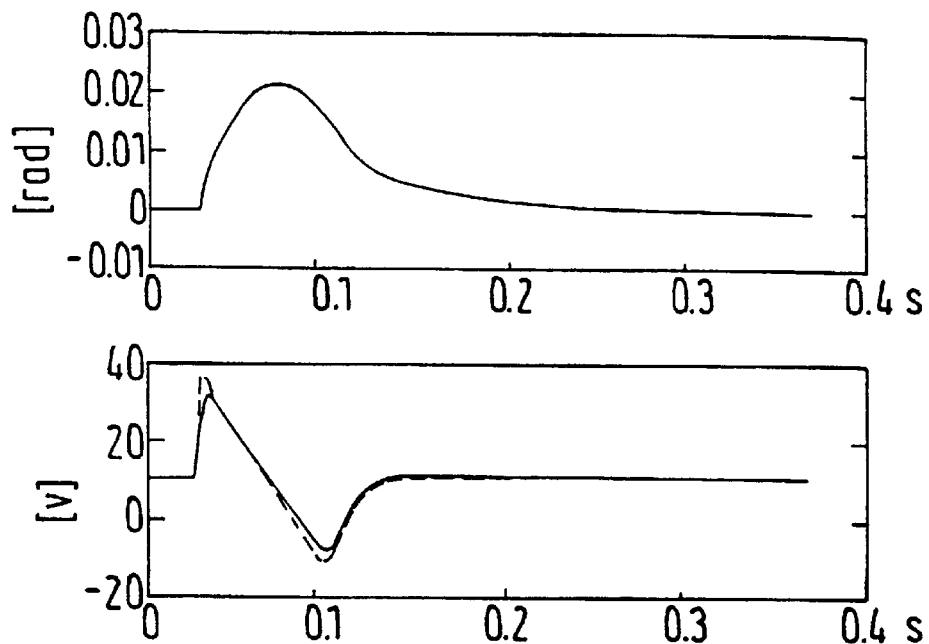
Figure 5:
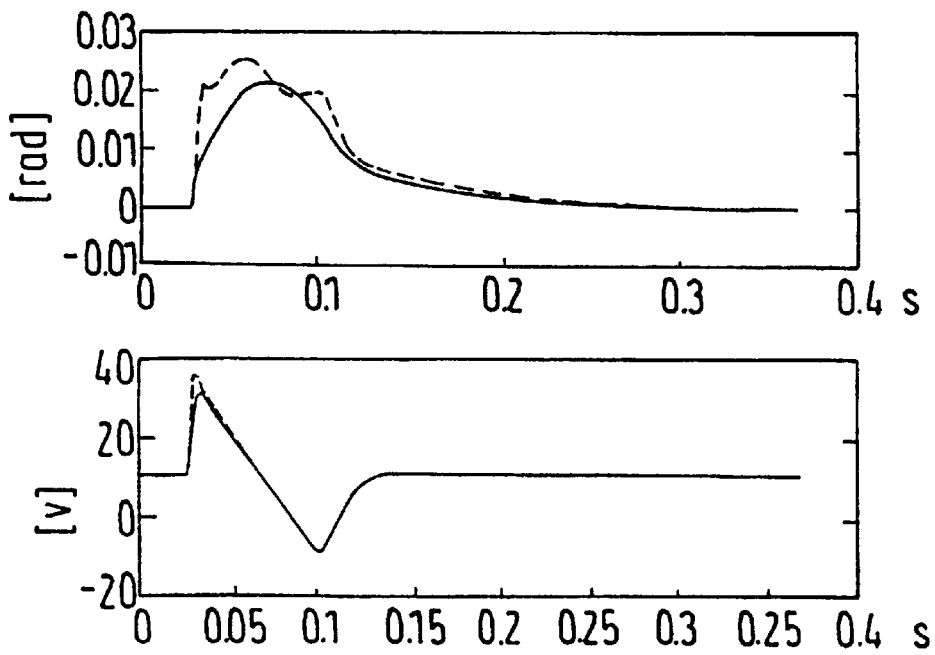
Figure 6:
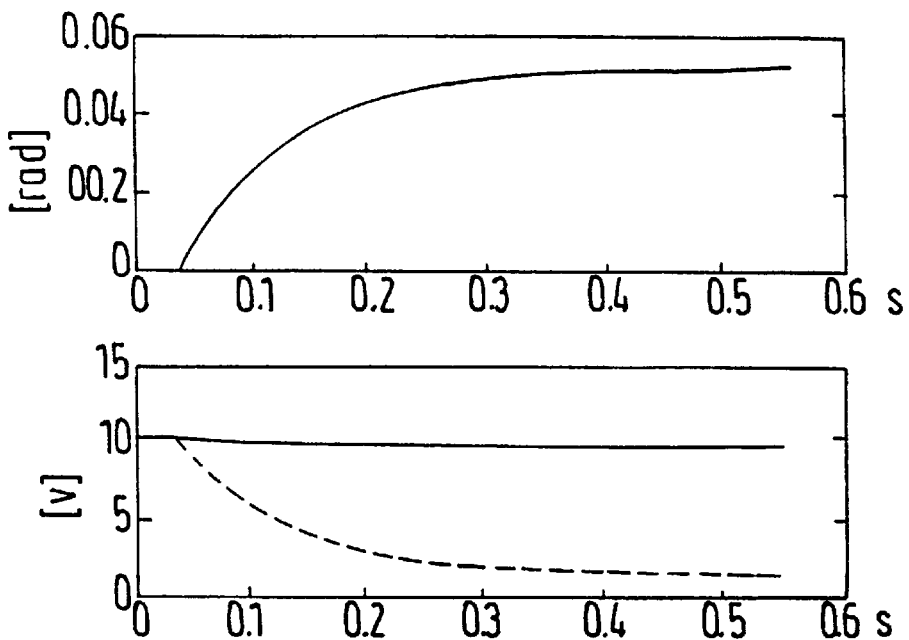
Figure 6:
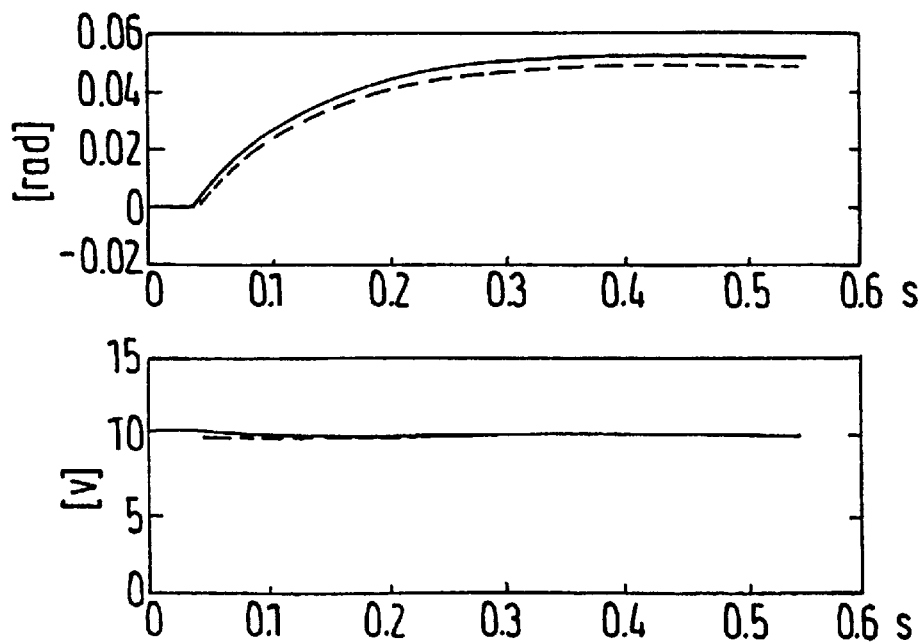

FIGS. 4 to 6 show improvements that can be achieved with such a correction of the transformation angle $\delta$ (flux angle).

In all of the FIGS. 4 to 6, part a) shows the situation that obtains without the error angle correction. Part b) illustrates the effect of the error angle correction. The time axis is plotted horizontally to the right. In the upper graph of the respective Figure parts a, b, the radian is plotted upwards and in the lower part of the Figure parts a, b the absolute value of the voltage is plotted upwards. In the upper part of the Figure parts a, b the difference between the desired value $\alpha_{soll}$ and the estimated value $\alpha$ (output of the integrator 10, FIG. 1) is plotted using a solid line and, if it is present, the value of the error angle $\epsilon$ is plotted using a broken line. In the lower part of the Figure parts a, b the voltage $u_{sdpred}$ plotted using a solid line and the voltage $u_{sdref}$ is plotted using a broken line.

FIG. 4 shows a jump in the phase angle of the stator from 0 to −0.2 radians. FIG. 4a shows that the error in an uncorrected system is relatively large, because $u_{sdref}$ (broken line) remains continuously hanging at a false value. The value of $\alpha_{soll} - \alpha$ on the zero line. According to FIG. 4b, $u_{sdref}$ is very quickly tracked on the value $u_{sdpred}$ (solid line). Both values coincide again after a few hundredths of a second. FIG. 4b also shows that the error angle $\epsilon$ adjusts correctly to 0.2 radians and stays at that level. This error angle correction method can thus very quickly compensate for a phase error.

In FIG. 5 the motor is reversed from −1000 rev/mn to 1000 rev/min. In this case it is apparent that $u_{sdref}$ on the uncompensated curve in FIG. 1a has a certain overswing which has been substantially reduced in FIG. 5b. Although $u_{sdref}$ also has an overswing in FIG. 5b, at the start of the reversing, because the error angle $\epsilon$ is overcompensating, after a short while the curves for the estimated voltage and the reference voltage run together again.

Finally, FIG. 6. shows the effect of increasing the rotor resistance by 50%, which can be attributable, for example, to an elevated temperature.

FIG. 6a shows that $u_{sdref}$ assumes a large, constant error, whilst FIG. 6b shows that this error is minimized again very quickly.

The method described here for correction of the flux vector estimation therefore has several advantages. Apart from a relatively simple structure, the method is also quick and resistant to changes that are initiated from the outside, for example, an increase in the rotor resistance as a result of heating. In addition, it is possible to speak of a virtually complete correction of the transformation angle so that it has its optimum value virtually throughout. This can normally be achieved only with higher-order estimators.

I claim:

1. Method for indirect field-oriented control of an induction motor by means of a frequency converter incorporating control mean, the method comprising the steps of:

(a) measuring rotor position of the motor, (b) calculating a slip frequency, (c) determining a transformation angle ($\delta$) from the measured rotor position ($\Theta r$) and the calculated slip frequency ($\omega s$) by summation, (d) making a first correction of the transformation angle ($\delta$) based on a fixed dead time, (e) measuring motor current, (f) determining a field-oriented voltage reference value ($U_{sdref}$) given by the control means, (g) estimating a field-orientated actual voltage value ($U_{sdpred}$) employing the magnetizing component of the measured motor current and taking into consideration a voltage drop proportional to the measured current, (h) calculating a voltage difference ($e_d$) between the voltage reference value ($U_{sdref}$) and the actual voltage value $U_{sdpred}$), (i) determining an error angle ($\epsilon$) between a voltage reference vector ($U_{so}$) and an actual voltage vector ($U'_{so}$) employing the voltage difference ($e_d$), assuming an approximately equal amplitude and a known phase angle of the voltage reference vector ($U_{so}$) and the actual voltage vector ($U'_{so}$), (j) making a second correction of the transformation angle ($\delta$) employing the determined error angle ($\epsilon$).

2. Method according to claim 1, in which the transformation angle is changed the second time by addition of the error angle.

3. Method according to claim 2, in which the transformation angle and the error angle are determined in a two-phase system, and the transformation angle is corrected by the error angle directly prior to inverse transformation into a system having at least three phases.

4. Method according to claim 1, in which the correction for the first time and the second time are performed simultaneously.

5. Method according to claim 1, in which the corrections are effected in a rotor flux-oriented system.

6. Method according to claim 5, in which rotor magnetizing current is used as a reference vector.

7. Method according to claim 2, in which the error angle is calculated.

8. Method according to claim 7, in which the error angle is calculated from two current components oriented orthogonally with respect to one another, angular velocity of a reference vector and a voltage reference vector.

9. Method according to claim 8, in which the error angle is calculated iteratively by minimizing a difference between a voltage reference vector component and a component of an estimated voltage.

10. Method according to claim 2, in which the error angle is limited to a range of ±0.4 radians.

11. Method for field-oriented control of an induction motor by means of a frequency converter, comprising determining a transformation angle by estimation, correcting the transformation angle a first time in dependence on one of I) the rotational speed of a rotor flux vector of the induction motor; II) the rotational speed of the induction motor; III) a time delay; and combinations of I), II) and III), and correcting the transformation angle a second time by determining an error angle ($\epsilon$) between a voltage reference vector ($U_{so}$) and an actual voltage sector ($U'_{so}$) employing a voltage difference ($e_d$), and adding this error angle to the corrected transformation angle.

12. Method according to claim 11, in which the transformation angle is changed the second time by addition of the error angle.

13. Method according to claim 12, in which the transformation angle and the error angle are determined in a two-phase system, and the transformation angle is corrected by the error angle directly prior to inverse transformation into a system having at least three phases.

14. Method according to claim 11, in which the corrections are effected in a rotor flux-oriented system.

15. Method according to claim 14, in which rotor magnetizing current is used as a reference vector.

16. Method according to claim 12, in which the error angle is calculated.

17. Method according to claim 16, in which the error angle is calculated from two current components oriented orthogonally with respect to one another, angular velocity of a reference vector and a voltage reference vector.

18. Method according to claim 17, in which the voltage reference vector is a component of a reference voltage oriented in the direction of a main axis of a biaxial system of co-ordinates.

19. Method according to claim 17, in which the error angle is calculated iteratively by minimizing a difference between a voltage reference vector component and a component of estimated voltage.

* * * * *